US012694442B2

(12) United States Patent
Goldberg et al.

(10) Patent No.: US 12,694,442 B2
(45) Date of Patent: Jul. 28, 2026

(54) SYSTEMS, NON-TRANSITORY COMPUTER READABLE MEDIUMS, AND METHODS FOR SPECTACLE REMOVAL AND VIRTUAL TRY-ON

(71) Applicant: WARBY PARKER INC., New York, NY (US)

(72) Inventors: Dee Celeste Goldberg, New York, NY (US); Benjamin Hall, New York, NY (US); David J. Deshazer, Verona, NJ (US); Sasha Laundy, New York, NY (US); Patrick Stock, New York, NY (US); Ignat Baltsyukevich, New York, NY (US); Stanislav Bychkovsky, New York, NY (US); Viktoria Pashkovskaya, New York, NY (US); Vladimir Kurs, New York, NY (US); Andrey Snetkov, New York, NY (US)

(73) Assignee: WARBY PARKER INC., New York, NY (US)

( * ) Notice: Subject to any disclaimer, the term of this patent is extended or adjusted under 35 U.S.C. 154(b) by 236 days.

(21) Appl. No.: 17/856,482

(22) Filed: Jul. 1, 2022

(65) Prior Publication Data

US 2024/0005387 A1 Jan. 4, 2024

(51) Int. Cl.
*G06Q 30/0601* (2023.01)
*G06T 3/4038* (2024.01)
(Continued)

(52) U.S. Cl.
CPC ..... *G06Q 30/06432* (2025.08); *G06T 3/4038* (2013.01); *G06T 5/70* (2024.01);
(Continued)

(58) Field of Classification Search
CPC .......... G06Q 30/0643; G06Q 30/06432; G06T 3/4038; G06T 5/70; G06T 7/11;
(Continued)

(56) References Cited

U.S. PATENT DOCUMENTS 9,892,561 B2 2/2018 Choukroun et al.
10,825,260 B2 11/2020 Goldberg et al.
(Continued)

OTHER PUBLICATIONS

C. Lassner, G. Pons-Moll and P. V. Gehler, "A Generative Model of People in Clothing," 2017 IEEE International Conference on Computer Vision (ICCV), Venice, Italy, 2017, pp. 853-862, doi: 10.1109/ICCV.2017.98. (Year: 2017).*
(Continued)

*Primary Examiner* — Jeffrey A. Smith
*Assistant Examiner* — Latasha D Ramphal
(74) *Attorney, Agent, or Firm* — Duane Morris LLP

(57) ABSTRACT

A system includes a computing device including a processor communicatively coupled to a camera. The computing device is configured to, in response to receiving a request, capture an image via the camera and detect, within the image, a first plurality of locations of a first object. The computing device is further configured to segment the first plurality of locations of the first object by determining, for each location of the first plurality of locations, a likelihood the corresponding location includes a part of the first object. The computing device is configured to inpaint a second plurality of locations with an associated likelihood the corresponding location includes the part of the first object above a threshold value. The computing device is additionally configured to generate an augmented image by superimposing a selected second object over the image and display the augmented image on a user interface of the computing device.

31 Claims, 4 Drawing Sheets

(51) Int. Cl.

| | |
|---|---|
| *G06T 5/70* | (2024.01) |
| *G06T 7/11* | (2017.01) |
| *G06T 15/20* | (2011.01) |
| *G06T 19/00* | (2011.01) |
| *G06V 10/82* | (2022.01) |
| *G06V 20/20* | (2022.01) |
| *G06V 20/40* | (2022.01) |
| *G06V 40/16* | (2022.01) |

(52) U.S. Cl.
CPC .............. *G06T 7/11* (2017.01); *G06T 15/205* (2013.01); *G06T 19/006* (2013.01); *G06V 10/82* (2022.01); *G06V 20/20* (2022.01); *G06V 20/46* (2022.01); *G06V 40/162* (2022.01); *G06Q 30/0643* (2013.01); *G06T 2200/24* (2013.01); *G06T 2200/32* (2013.01); *G06T 2207/20084* (2013.01); *G06T 2207/30201* (2013.01); *G06T 2215/16* (2013.01)

(58) Field of Classification Search
CPC . G06T 15/205; G06T 19/006; G06T 2200/24; G06T 2200/32; G06T 2207/20084; G06T 2207/30201; G06T 2215/16; G06T 2210/16; G06V 10/82; G06V 20/20; G06V 20/46; G06V 40/162; G06V 10/25; G06V 10/26; G06V 20/60
See application file for complete search history.

(56) References Cited

U.S. PATENT DOCUMENTS

| | | | | |
|---|---|---|---|---|
| 11,334,267 | B1 * | 5/2022 | Rao | .......................... G06F 3/165 |
| 2010/0046839 | A1 * | 2/2010 | Washida | ................ G06V 20/52 |
| | | | | 382/298 |
| 2013/0127844 | A1 | 5/2013 | Koeppel et al. | |
| 2016/0162735 | A1 | 6/2016 | Yoon | |
| 2018/0005448 | A1 | 1/2018 | Choukroun et al. | |
| 2018/0089903 | A1 | 3/2018 | Pang et al. | |
| 2020/0183969 | A1 * | 6/2020 | Wiesel | .................. G06F 16/583 |
| 2020/0219326 | A1 * | 7/2020 | Goldberg | ............. G06T 19/006 |
| 2020/0410775 | A1 | 12/2020 | Varady et al. | |
| 2021/0065285 | A1 | 3/2021 | Goldberg et al. | |
| 2021/0327148 | A1 | 10/2021 | Goldberg et al. | |
| 2021/0374839 | A1 | 12/2021 | Luo et al. | |
| 2021/0383242 | A1 * | 12/2021 | Ostyakov | ................. G06T 7/11 |
| 2023/0353701 | A1 * | 11/2023 | Shukla | ................ H04N 5/2621 |

OTHER PUBLICATIONS

Ronneberger, O., et al., "U-Net: Convolutional Networks for Biomedical Image Segmentation," University of Freiburg, Germany, published at https://arxiv.org/abs/1505.04597 [cs.CV], May 18, 2015, 8 pages.

Zicong, Jiang, et al., "Real-time object detection method for embedded devices," College of Electrical and Information Engineering, Beihua Univerity, Jilin132012, China, published at https://arxiv.org/abs/2011.04244 [cs.CV], Nov. 9, 2020, 11 pages.

Hu, Bingwen, et al., "Unsupervised Eyeglasses Removal in the Wild," published at https://arxiv.org/abs/1909.06989 [cs.CV], Sep. 16, 2019, 12 pages.

Lee, Yu-Hui, et al., "ByeGlassesGAN: Identify Preserving Eyeglasses Removal for Face Images," Department of Computer Science, National Tsing Hua University, Taiwan, published at https://arxiv.org/abs/2008.11042 [cs.MM], Aug. 25, 2020, 16 pages.

Sola, Phillip, et al., "Image-to-Image Translation with Conditional Adversarial Networks," Berkeley AI Research Laboratory, US Berkeley, published at https://arxiv.org/abs/1611.07004 [cs.CV], Nov. 21, 2016, 17 pages.

Zeng, Yanhong, et al., "Aggregated Contextual Transformations for High-Resolution Image Inpainting," published at https://arxiv.org/abs/2104.01431 [cs.CV], Apr. 3, 2021, 14 pages.

International Search Report and Written Opinion issued for PCT Application No. PCT/US2023/025955 issued Sep. 26, 2023.

Extended European Search Report issued for European Patent Application No. 23832167.3 dated Nov. 3, 2025 12 pages.

* cited by examiner

SYSTEMS, NON-TRANSITORY COMPUTER READABLE MEDIUMS, AND METHODS FOR SPECTACLE REMOVAL AND VIRTUAL TRY-ON

FIELD

The present disclosure relates to augmented reality by implementing neural networks and more particularly augmenting reality to remove an item and replace the item with a virtual item.

BACKGROUND

In order to visualize how a particular item would look on an individual, virtual try on methods have been implemented to place a virtual item on an item or a video of an individual. Depending on the individual, other items may exist in the image or video that obstruct visualization of the virtual item.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a computing device. The computing device includes at least one processor that is communicatively coupled to a camera. The computing device is configured to, in response to receiving a request, capture at least one image via the camera and detect, within the at least one image, a first plurality of locations of a first object. The computing device is further configured to segment the first plurality of locations of the first object by determining, for each location of the first plurality of locations, a likelihood the corresponding location includes a part of the first object. The computing device is also configured to inpaint a second plurality of locations with an associated likelihood the corresponding location includes the part of the first object above a threshold value. The computing device is additionally configured to generate an augmented image by superimposing a selected second object over the at least one image and display the augmented image on a user interface of the computing device.

In further aspects, the first plurality of locations of the first object are pixels within the at least one image.

In further aspects, the first plurality of locations includes more locations than the second plurality of locations.

In further aspects, the first plurality of locations includes fewer locations than the second plurality of locations.

In further aspects, the first plurality of locations and the second plurality of locations are the same.

In further aspects, the computing device is configured to capture a real-time video via the camera and, for a subset of a number of frames of the real-time video, inpaint the set of locations of the plurality of locations.

In further aspects, the subset of the number of frames is based, at least in part, on computational capabilities of the computing device.

In some embodiments, the computational capabilities of the computing device is determined based on a model of the computing device.

In further aspects, the computing device is configured to, prior to generating the augmented image, reduce spurious noise by blending a previous image with a present image.

In further aspects, in response to detecting an absence of the plurality of locations of the first object, the computing device is configured to skip the segmenting and inpainting steps to generate the augmented image.

In further aspects, in response to the second plurality of locations having the associated likelihood below a bottom threshold, the computing device is configured to skip the inpainting step to generate the augmented image.

In further aspects, the system includes a remote database configured to store a set of objects including the selected second object, wherein the computing device is configured to obtain the selected second object from the remote database.

In further aspects, the selected second object is indicated in the request.

In further aspects, the computing device is a mobile computing device.

In further aspects, the first object is a set of spectacles.

In further aspects, the part of the first object is a frame of a set of spectacles.

In further aspects, the computing device is configured to detect, within the at least one image, the first plurality of locations of the first object by implementing a first neural network. In further aspects, the computing device is configured to segment the first plurality of locations of the first object by determining, for each location of the first plurality of locations, the likelihood the corresponding location includes the part of the first object using a second neural network. In further aspects, the computing device is configured to inpaint the second plurality of locations with the associated likelihood the corresponding location includes the part of the first object above the threshold value by implementing a third neural network.

A method includes, in response to receiving a request, capturing, via a computing device including at least one processor and communicatively coupled to a camera, at least one image via the camera. The method further includes detecting, within the at least one image, a first plurality of locations of a first object. The method also includes segmenting the first plurality of locations of the first object by determining, for each location of the plurality of locations, a likelihood the corresponding location includes a part of the first object. The method additionally includes inpainting a second plurality of locations with an associated likelihood the corresponding location includes the part of the first object above a threshold value. The method further includes generating an augmented image by superimposing a selected second object over the at least one image and displaying the augmented image on a user interface of the computing device.

In some aspects, the detecting is performed by a first module, the segmenting is performed by a second module, and the inpainting is performed by a third module.

In some aspects, the first module is different from the second module and the third module.

In some aspects, the second module is different from the first module and the third module.

In some aspects, the third module is different from the first module and the second module.

In some aspects, the first and second modules are the same module.

In some aspects, the second and third modules are the same.

In some aspects, the first, second, and third modules are separate modules each configured to execute a respective artificial neural network.

In some aspects, the first and second modules are the same module.

In some aspects, a method includes determining computational capabilities of the computing device; capturing a real-time video including a first plurality of frames via the camera; and inpainting the second plurality of locations in a second plurality of frames. The second plurality of frames may be based on the computational capabilities of the computing device.

In some aspects, the second plurality of frames may be different from the first plurality of frames.

In some aspects, a method may include blending a previous image with a present image to reduce spurious noise prior to generating the augmented image.

In some aspects, a method may include, in response to detecting an absence of the plurality of locations of the first object, skipping the segmenting and inpainting steps to generate the augmented image.

A non-transitory computer readable medium having instructions stored thereon. The instructions, when executed by at least one processor, cause a device to perform operations. The operations may include, in response to receiving a request, capturing, via a computing device including the at least one processor and communicatively coupled to a camera, at least one image via the camera. The operation may include detecting, within the at least one image, a first plurality of locations of a first object. The operations may include segmenting the first plurality of locations of the first object by determining, for each location of the first plurality of locations, a likelihood the corresponding location includes a part of the first object. The operations may include inpainting a second plurality of locations with an associated likelihood the corresponding location includes the part of the first object above a threshold value. The operations may include generating an augmented image by superimposing a selected second object over the at least one image and displaying the augmented image on a user interface of the computing device.

In some aspects, the detecting may be performed by a first module, the segmenting is performed by a second module, and the inpainting is performed by a second module.

In some aspects, the operations may include determining computational capabilities of the device; capturing a real-time video including a first plurality of frames via the camera; and inpainting the second plurality of locations in a second plurality of frames. The second plurality of frames may be based on the computational capabilities of the device.

In some aspects, the operations may include blending a previous image with a present image to reduce spurious noise prior to generating the augmented image.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 2:
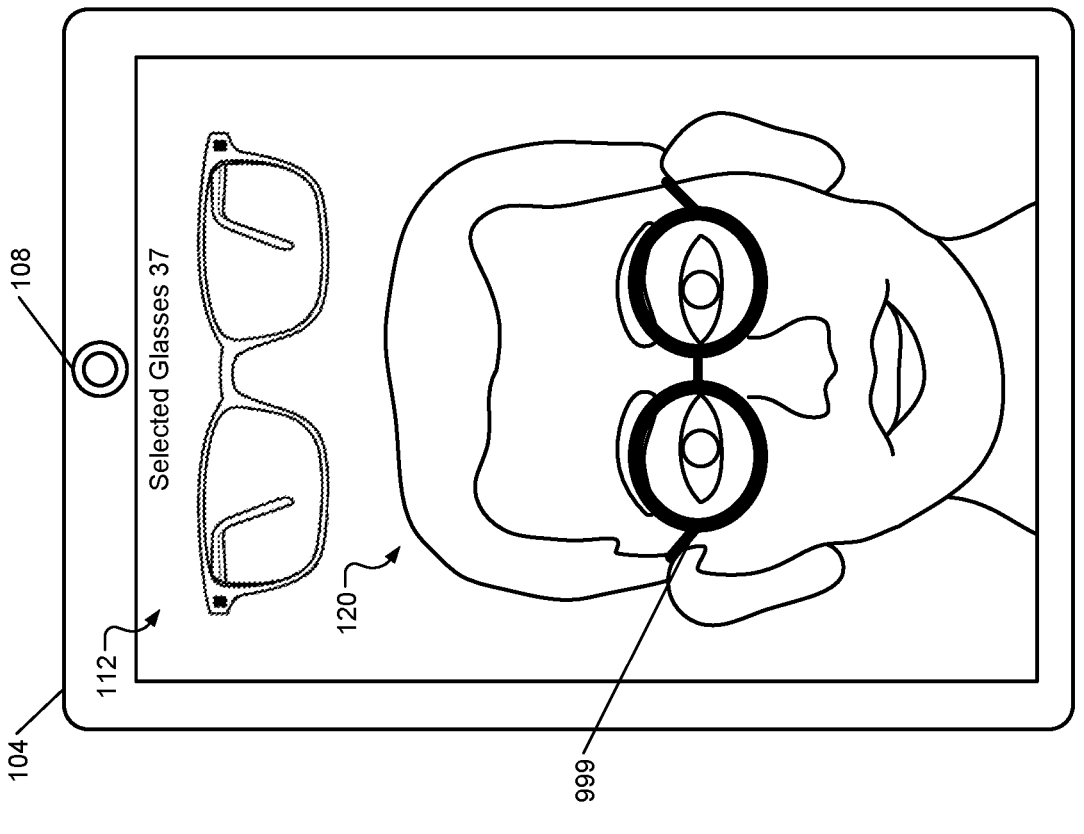
FIGS. 1-4 are example user interfaces of a user device for a user to navigate to virtually try on a pair of spectacles.
Figure 2:

A virtual try on system may be implemented on a user device to remove spectacles or other objects existing in an image or a video of a user and superimpose a selected pair of spectacles or other objects onto the user over the image or video where existing spectacles were removed. In general, virtual try on technology uses augmented reality to show a user how a pair of spectacle frames will look on the user's face. For example, the user may be browsing a variety of pairs of spectacles on the user device and select a pair for a virtual try on. To perform the virtual try on, an image of the customer is captured by a camera included in or communicatively coupled with the user device and spectacle frames are superimposed on the captured image. The user interface of the user device displays the composite image back to the user. This process can be carried out on a single image, a sequence of images (i.e., a video), or in a real-time, streaming fashion. While the following description is provided with reference to a try on system for spectacles, it should be understood that the concepts disclosed herein may be used for other purposes. For example, the systems and methods described herein may be used to detect a first object in an image and replace the first object with a second object that is different from the first object. The augmented image, i.e., an image in which the first object has been replaced with a second object, may then be displayed or otherwise presented to a user or other individual.

In various scenarios, the user may already be wearing glasses and, in order to see the composite image or video displayed back to the user properly, needs to continue wearing their existing glasses. However, superimposing virtual glasses on top of existing glasses would not produce a clear or realistic image to the user of what the virtual glasses would look like on the user.

The present virtual try on system not only superimposes a selected pair of spectacles on an image or images of a user but, prior to the superimposition, detects and removes any existing spectacles using a combination of multiple modules or neural networks. In some embodiments, three neural network are implemented in a series of steps to (1) detect the spectacles, (2) segment a frame of the spectacles, and (3) inpaint the identified spectacle frame prior to superimposing the selected pair of spectacles. The segmentation step analyzes each pixel in the image to determine the probability that the pixel belongs to a specific object class or a background class. The inpainting step involves the process of interfering the content of missing portions of an image on the basis of neighboring portions of the image, patterns learned from training a set of images, or some combination of the two. It should be appreciate that while three neural networks are described in the examples that follow, fewer or more neural networks may be used. The benefit of using plural, separate neural networks for each of the above steps in detecting, segmenting, and inpainting the existing pair of spectacles is that the particular neural networks can be directed to the specific step or task, instead of single neural network generally performing each step. That is, by breaking up the virtual try on system into using three different neural networks, the virtual try on system is able to run in real-time (e.g., while the user is taking a streaming video of themselves) and use less memory compared to using a single neural network to perform the entire analysis. This is advantageous when a user device or other computing device may have limited processing capability, such as when the computing device is a mobile phone, tablet, or lightweight computer. Further, in various implementations, the virtual try on system may also incorporate a method of reducing transient spurious noise introduced by the inpainting process. This method reduces the noise between superimposed images to reduce blur and transition from a first image to a second image more seamlessly by averaging or mixing the images.

In some embodiments, the first step in removing the existing, real spectacles that the user is wearing is detection of a pair of spectacles, which is accomplished using a first neural network, for example, with a yolov4-tiny object detection neural network, pre-trained on an image dataset. Although the yolov4-tiny object detection neural network is referenced as an example, one of ordinary skill in the art will understand that other neural networks may be used to perform the object detection. The first neural network may be trained on an image dataset of manually annotated images of individuals wearing spectacles and identifying a region of interest that includes the spectacles. The identified region of interest may be, for example, a box surrounding the frames of the spectacles. The detection step not only simplifies the analysis if no spectacles are detected, but also reduces the area in which to segment/identify the frames, allowing the segmentation to operate faster. In various implementations, if no spectacles are detected, the virtual try on system may be directed to superimpose the selected pair of spectacles as no existing spectacles needs to be removed.

Once spectacles are detected and the region of interest is identified, the virtual try on system may segment the spectacles by determining, for each pixel within the region of interest, a likelihood that the pixel includes part of the frame of the spectacles. The segmentation may be completed using a second neural network that has, for example, a Unet neural network architecture and a ReLU activation function. Again, while the Unet neural network architecture and ReLU activation functions are references, other neural network architectures and/or activation functions may be implemented. The second neural network may be trained using a custom dataset that includes images with synthetic glasses and images with real glasses that were hand-segmented with custom tools. In various implementations, the second neural network returns a percentage for each pixel in the region of interest indicating how likely the pixel is to include part of the frame of the spectacles. For example, if the percentage is above 50%, the pixel may be decided to include some of the frame of the glasses. It should be understood that other percentages may be used to decide if a pixel includes some of a frame of spectacles or other object that may be desired to be removed from one or more images.

Next, a third neural network may be implemented to inpaint the pixels that are determined to include some of the spectacle frame. The inpainting may be accomplished by using an AOT-GAN neural network with a VGG16 encoder pre-trained on an image dataset; however, other neural networks and/or encoders may be used. In some embodiments, to ensure both per-pixel reconstruction accuracy and the visual fidelity of inpainted images, the third neural network may be trained with four optimization objectives: an L1 loss, a style loss, a perceptual loss, and an adversarial loss. The training set may include thousands of paired images, both with and without spectacles. To generate the training data, synthetic spectacles may be superimposed on images in the dataset of individuals without spectacles. The result of the inpainting step may include replacing the pixels, including a frame, with what the third neural network identifies as what is likely to be in that pixel if the frames are not there based on the images used to train the third neural network.

As the each of the described steps of detection, segmentation, inpainting, etc., can be computationally intensive, the virtual try on system may not implement the inpainting on every video frame of a video and still achieve real-time operation. In order to overcome this, the inpainting step may be implemented on fewer than all the video frames or images, for example, on every third image, although inpainting may be performed on other numbers of images (e.g., two, four, etc.). To accomplish this, on images on which the inpainting is not performed, the segmented pixels are filled with information from the most recently inpainted image. In various implementations, the virtual try on system may have a particular number of images where the inpainting step is skipped based on the device on which the virtual try on is being performed. For example, on devices with better processing speed or power, the inpainting step may be completed on every image or every other image, while those user devices with reduced processing capabilities may perform inpainting on only every third, fourth, or other image.

The virtual try on system may then superimpose a selected pair of spectacles that is identified in a user request. For example, as described in U.S. Pat. No. 10,825,260 to Goldberg, et al. and U.S. Publication No. 2021/0065285 to Goldberg, et. al, which are hereby incorporated by reference in their entirety. Additionally, in various implementations, the virtual try on system may implement a form of reducing spurious noise between the inpainting and superimposing steps. For example, the output of the segmentation and inpainting neural networks may result in time-varying visual instability or lag that is salient and visible to users. To mitigate the instability, the virtual try on system may display a mix of previous inpainted images and current inpainted images. The reduction of spurious noise estimates the motion of the existing spectacles by comparing previous and current segmentation masks to transform the previous inpainting results prior to mixing them with the current inpainting results.

Figure 1:
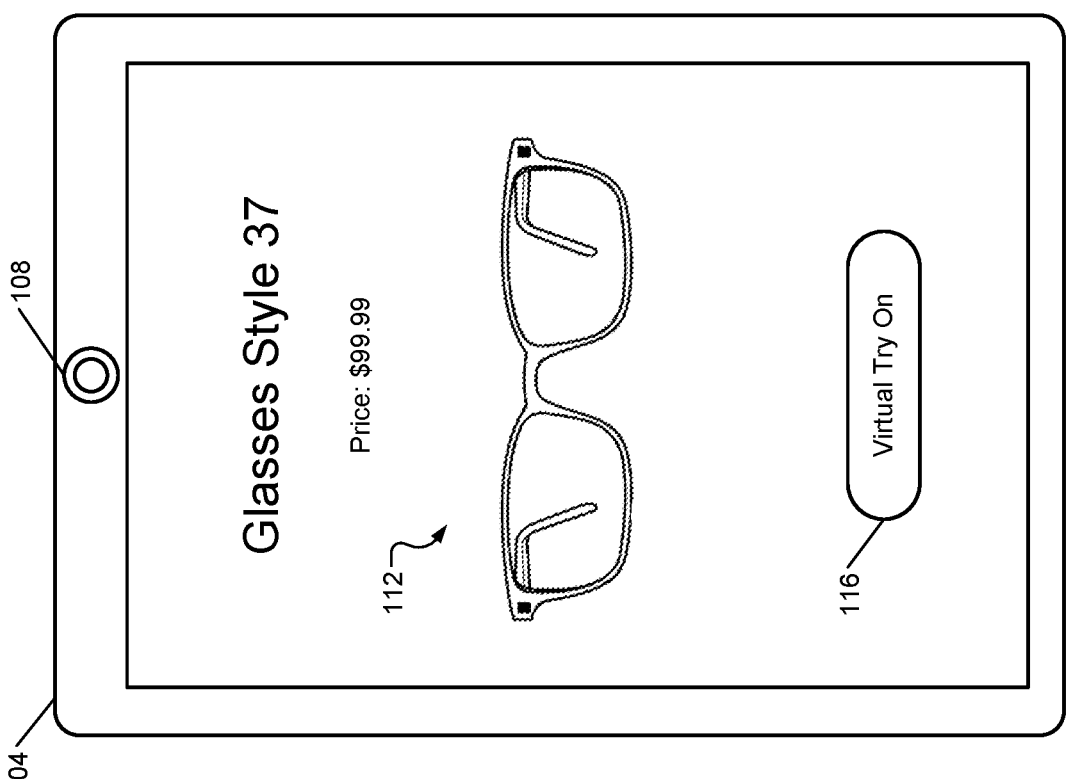

Referring to FIGS. 1-4, example user interfaces of a user device for a user to navigate to virtually try on a pair of spectacles are shown. FIG. 1 depicts a user device 104 including a front-facing camera 108. For example, the user may browse an ecommerce platform including a plurality of spectacles a select a pair of spectacles 112 to view. As shown in FIGS. 1-4, the user may select glasses style 37 and the user interface may display a price of the spectacles. The user may further select a user interface button 116 to virtually try on the selected pair of spectacles 112.

As shown in FIG. 2, once selected, the camera 108 may begin to capture images or video of a user 120 wearing a pair of existing spectacles 124. As noted previously, if the user is not wearing any spectacles, the virtual try on system may not detect any spectacles and continue to simply superimpose the selected pair of spectacles 112 on the user 120.

Figure 3:
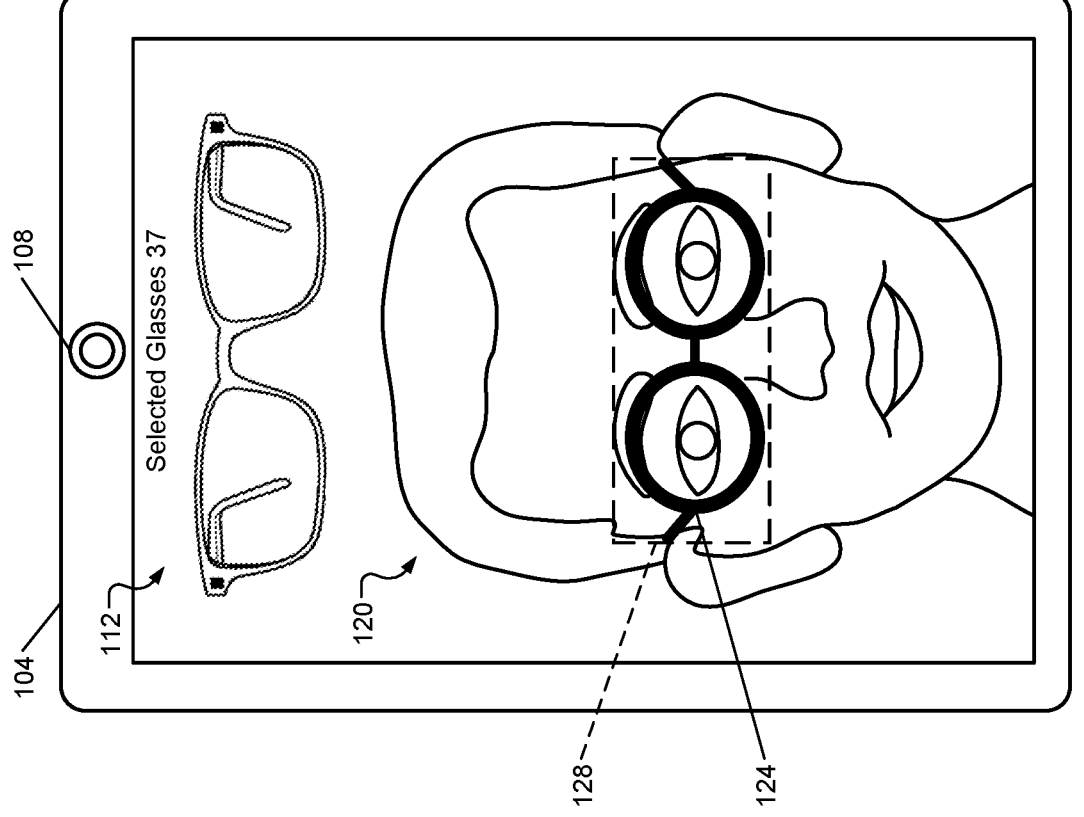

Continuing to FIG. 3, the virtual try on system identifies a region of interest 128 that includes the existing spectacles 124 on the user 120 using a first neural network, as previously discussed. As also previously mentioned, within the region on interest 128, a plurality of pixels are identified and segmented as including frames of the existing spectacles 124 or not including frames. As noted, a percentage likelihood may be associated with each pixel in the region of interest 128, indicating how likely it is that the pixel includes part of the frames of the existing spectacles 124 using a second neural network.

Figure 4:
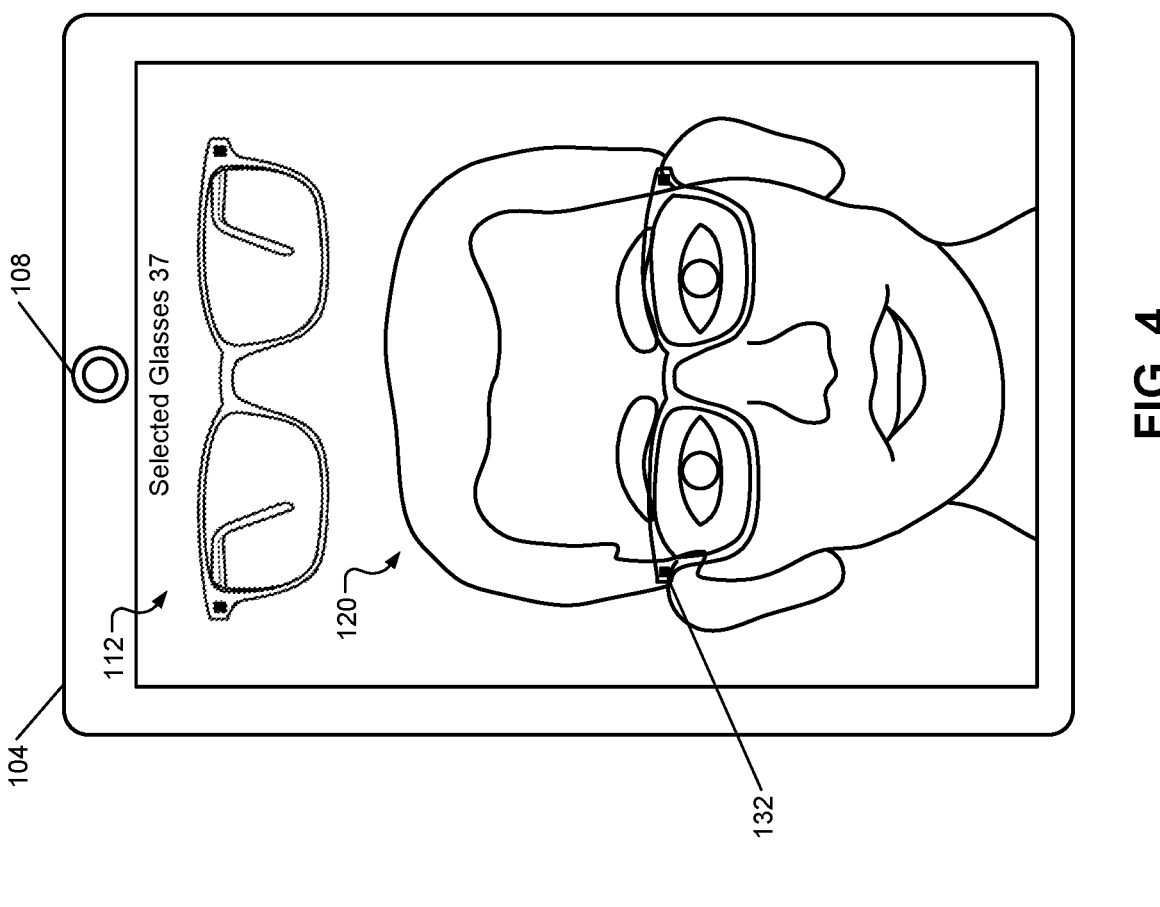

In FIG. 4, an image may be presented to the user that includes the superimposed spectacles 132 on the user 120. As discussed, after the segmentation, the frames of the existing spectacles 124 may be inpainted using a third neural network to fill in those pixel with what is likely to be displayed in those pixel if the frames were not there. Then, the selected spectacles 112 are superimposed on to the user 120.

Figure 5:
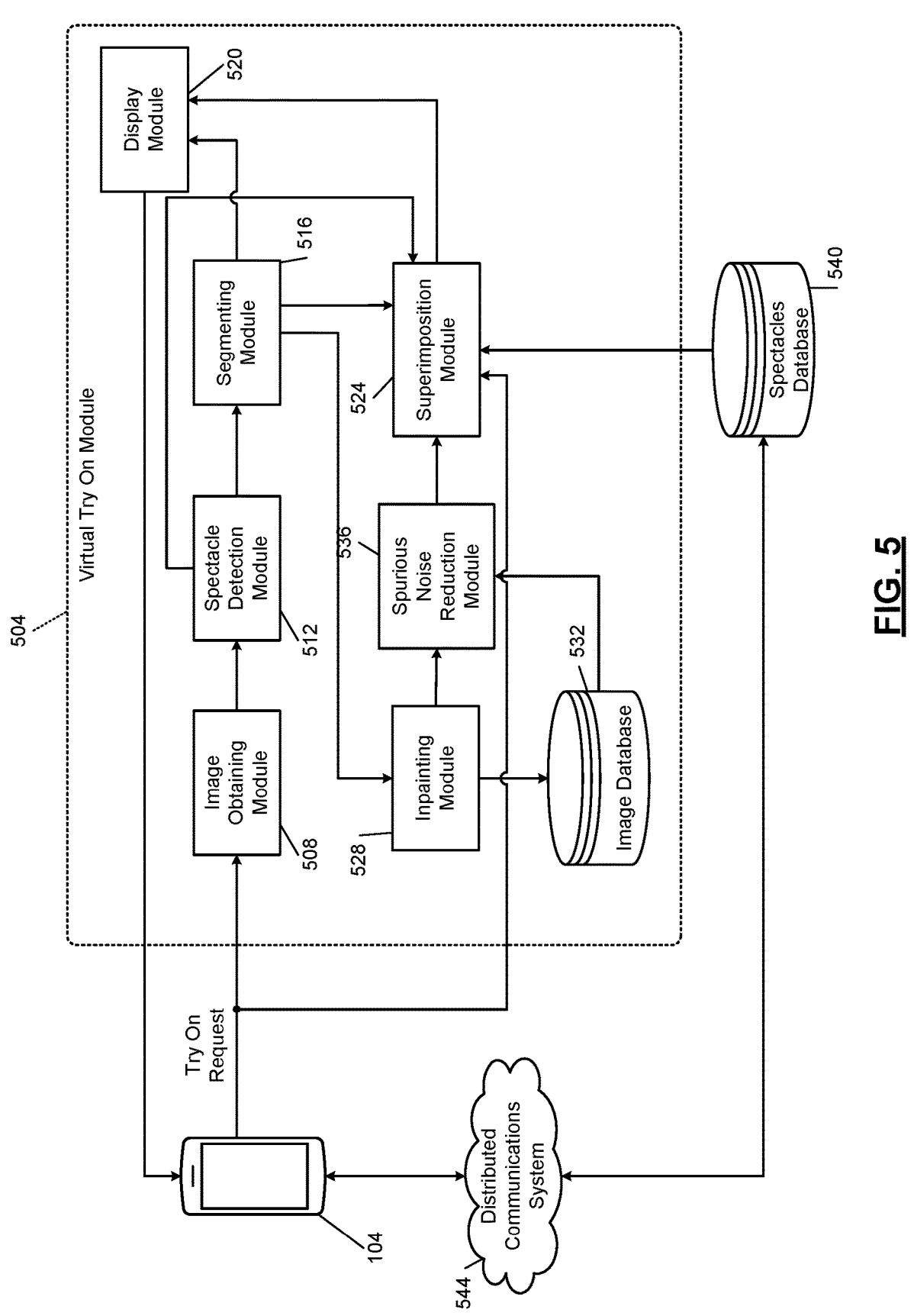
FIG. 5 is a functional block diagram of an example architecture for implementing a virtual try on device.

Referring now to FIG. 5, a functional block diagram of an example architecture for implementing a virtual try on module 504 is shown. The virtual try on module 504 may be an application stored on the user device 104 and implemented on the user device 104 using at least one processor of the user device 104. The virtual try on module 504 may include an image obtaining module 508 that receives a try on request from a user interface of the user device 104 (for example, by selecting the button displayed in FIG. 1). Once the image obtaining module 508 receives a request from user selection of a user interface item, the image obtaining module 508 may initiate the camera of the user device 104 and receive real-time images from the camera of the user device 104. The images are forwarded to a spectacle detection module 512.

In some embodiments, the spectacle detection module 512 may implement a first neural network, as discussed previously to detect an existing pair of spectacles and identify a region of interest including the existing pair of spectacles. The region of interest may only include the existing spectacles and/or the frame of the existing spectacles as this is the region of the image or images that is going to be augmented or adjusted. Since the camera of the user device 104 may be providing a live video feed (e.g., a successive plurality of images), the user may be constantly moving. Therefore, the spectacle detection module 512 may be configured to detect the existing spectacles and track the spectacles.

To do this, the first neural network may implement an object detector called yolov4-tiny, which is a small neural network capable of working in real-time on a user device 104, such as a mobile phone, tablet, etc. The first neural network may also be capable of working in real-time on other devices, such as a laptop computer, a desktop computer, and/or on one or more servers that are coupled communicatively (e.g., via one or more networks) to a user device. In some embodiments, to train the first neural network, the spectacle detection module 512 may use a Darknet framework and later convert the model to Keras, and eventually convert to a Core ML format using a custom conversion pipeline. The first neural network may be trained for image resolution of 416×416 to provide a tradeoff between quality and performance, although higher or lower resolutions may be used. The first neural network may be trained using a training dataset of approximately 2000 images that have been manually annotated to identify, in images of individuals wearing spectacles, the location and region of interest in the image, although larger or smaller training datasets may be used.

Once the region of interest is identified, the image and the region may be forwarded to a segmenting module 516 to apply the second neural network to the plurality of pixels within the region of interest and determine, for each pixel, a likelihood the pixel includes part of the frame of the existing pair of spectacles. The second neural network may be a UNet neural network architecture with ReLU activation function. The second neural network may be trained using Keras framework and using Adam optimizer and a binary cross-entropy loss function. In various implementations, the captured image identifying the region of interest may be resized to 256×256 and grayscale, and is then used as input to the second neural network. However, it should be understood that resizing of the image may be omitted or the image may be resized to other sizes and/or color formats or image types.

The output of the second neural network may be a binary mask, which highlights the locations of the frame of the spectacles including arms of the spectacles. In various implementations, the binary mask is constructed by including those pixels that have a resulting likelihood of including the frames above a threshold percentage, such as 50%. The resulting binary mask may be resized using bicubic interpolation to match the original part of image. The second neural network may be trained using a training dataset of approximately 73,000 pairs of images including individuals wearing spectacles and a manually identified binary mask of the frames of the spectacles, although other training sets may be used. In various implementations, if all of the pixels have a corresponding likelihood below a threshold value, such as 30%, or an average of all the likelihoods being below the threshold value, the segmenting module 516 may generate and send an alert to a display module 520 to display on the user interface of the user device 104 that an existing pair of spectacles is not found. Additionally or alternatively, the alert or indication may be forwarded to a superimposition module 524 to superimpose the selected spectacles on the user, as existing spectacles were not found with enough confidence.

The binary mask of the frames of the existing spectacles may be forwarded to an inpainting module 528 that implements a third neural network. The third neural network may be implemented using AOT-GAN, which is a generative adversarial network. The specificity of the third neural network is special AOT-blocks, which are optimized for large missing areas, and includes an enhanced discriminator, which better distinguishes the detailed appearance of real and synthesized patches. The third neural network may be implemented on the Pytorch framework with VGG16 encoder pre-trained on sets of images (approximately 6,700 pairs) of individuals with a binary mask and not wearing spectacles. Here again, other types of neural networks and/or training sets may be used.

In various implementations, the inpainting module 528 may select to inpaint each image of the real-time images received from the user device 104 camera or a subset of those images based on the type of user device 104. For example, if the user device 104 is an older model or has a reduced processing ability (e.g., a processing capability that is less than a threshold processing capability), the inpainting module 528 may inpaint every third image and use the most recently inpainted pixels for any images that are not being inpainted. In some embodiments, the number of images that are inpainted is based on processing capability of the user device. For example, if processing power or computational capabilities exceed a first threshold value, then the inpainting is applied to every image. If processing power or computational capabilities of the user device is less than the first threshold value but greater than a second threshold, then the inpainting may be applied to every other image. In another example, if processing power or computational capabilities of the user device is less than the second threshold but greater than a third threshold, then the inpainting may be applied to every third image.

In various implementations, the inpainted image may be stored in an image database 532, which stores images for a threshold period to use previously inpainted images for reducing spurious noise. The inpainted image may also be forwarded to a spurious noise reduction module 536 that combines previously inpainted images and a presently inpainted image to avoid the appearance of lag on the image displayed to the user. The spurious noise reduction module 536 may implement a particular algorithm to blend a previous image with a present image. For example, for the first frame (i=1), the output mask is the same as the input mask and the output image is the same as the inpainted image.

Otherwise, the warping operation H(•) that characterizes the transformation from the previous output mask $M'_{i-1}$ to the current input mask $M_i$ can be found with OpenCV's findTransformECC( ) function and applied with OpenCV's warpPerspective( ) function. The output mask may be $M'_i$ a mix of the current input mask and a warped version of the previous output mask: $M'_i = \alpha_M M_i + (1 - \alpha_M) H(M'_{i-1})$. If an inpainted image is available, for example from the image database 532, the spurious noise reduction module 536 blends the previous image and present image so the region corresponding to the output mask is a mix of the current inpainted image $Y_i$ and a warped version of the previous output image $H(Y'_{i-1})$. The rest of the image is given by the inpainted image $Y_i$, as shown in the following equation: $Y'_i = B(M'_i) \odot [\alpha_Y Y_i + (1 - \alpha_Y) H(Y'_{i-1})] + [1 - B(M'_i)] \odot Y_i$ where $B(\cdot)$ represents a binarization operation and $\odot$ represents a pixel-wise multiplication. However, if an inpainted image is not available in the image database 532, the spurious noise reduction module 536 instead has the region corresponding to the output mask given by a warped version of the previous output image $H(Y'_{i-1})$ and the rest of the image is given by the input image $X_i$, as shown in the following equation: $Y'_i = B(M'_i) \odot H(Y'_{i-1}) + [1 - B(M'_i)] \odot X_i$.

In various implementations, the spurious noise reduction module 536 is optional. Once the image is inpainted and spurious noise is reduced, the superimposition module 524 imposes the selected pair of spectacles, as indicated in the try on request, on the user. The superimposition module 524 may obtain the corresponding pair of spectacles from a spectacles database 540 that is remote and accessible to the user device 104 via a distributed communications system 544. The superimposition module 524 may forward the superimposed image to the display module 520 to display on the user interface of the user device 104.

Figure 6:
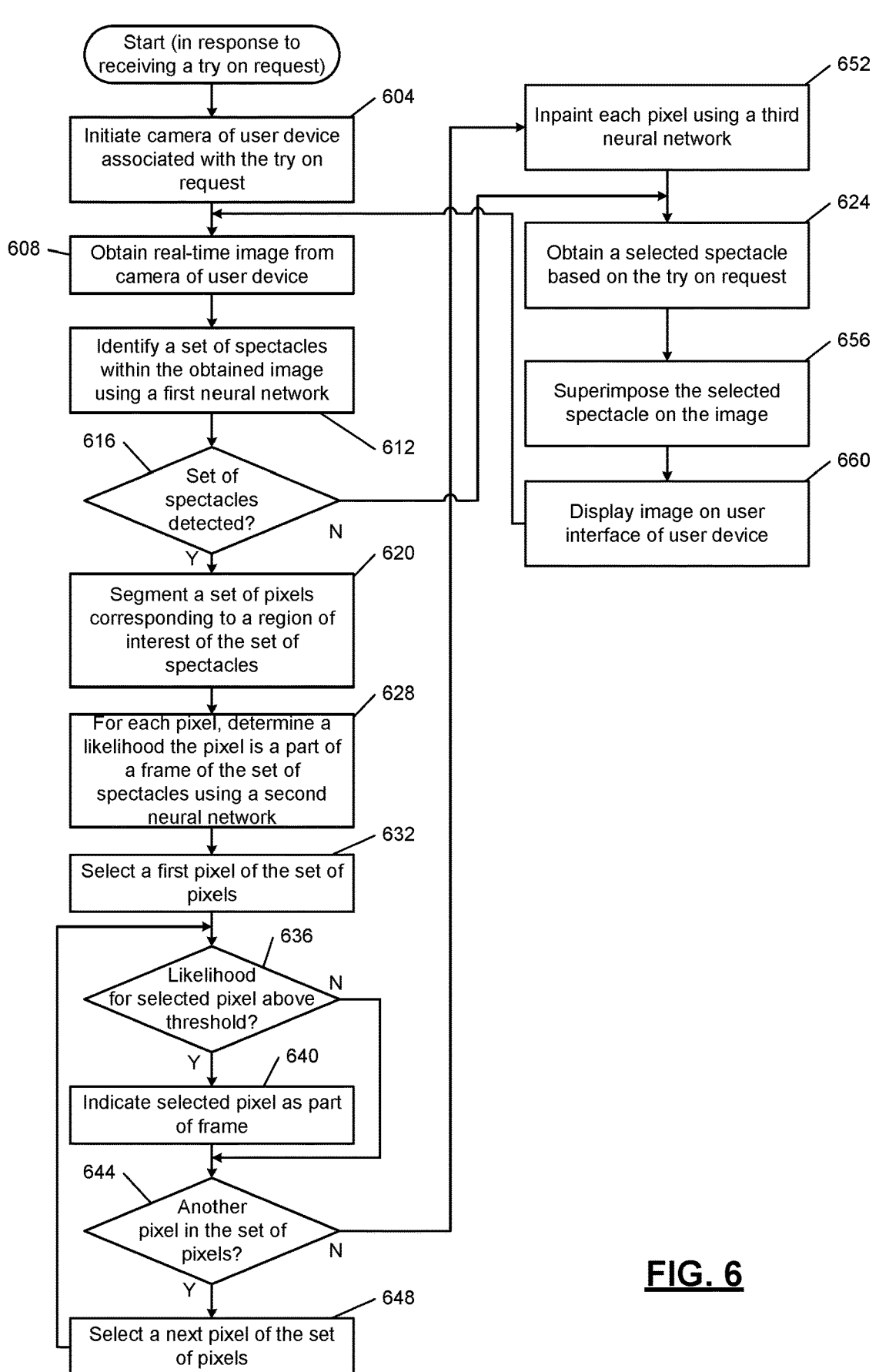
FIG. 6 is an example flowchart depicting performance of virtual spectacle removal and replacement.

Referring now to FIG. 6, an example flowchart depicting performance of virtual spectacle removal and replacement is shown. For example, the flowchart of FIG. 6 may be implemented on the user device 104. It should be understood that the flowchart of FIG. 6 may be implemented in a distributed processing system in which plural devices (e.g., processors and/or computers) implement all or a portion of the flowchart illustrated in FIG. 6. In some embodiments, control begins in response to receiving a try on request. Control continues to 604 to initiate a camera of the user device associated with the try on request. Control continues to 608 to obtain a real-time image or video feed from a camera, which may be included in the user device or other camera communicatively coupled to the user device. Control proceeds to 612 to identify a set of spectacles within the obtained image using a first neural network, as previously noted. Control continues to 616 to determine if a set of spectacles was detected.

If a set of spectacles is detected, control continues to 620. Otherwise, control proceeds to 624 to obtain a selected spectacle based on the try on request. Returning to 620, control proceeds to segment a set of pixels corresponding to the detected region of interest of the set of spectacles. The region of interest may be identified by the first neural network when detecting the spectacles. Control continues to 628 to, for each pixel, determine a likelihood the pixel is part of a frame of the set of spectacles using a second neural network. Control proceeds to 632 to select a first pixel of the set of pixels. Then, control continues to 636 to determine if the likelihood for the selected pixel is above a threshold. For example, as previously discussed, if the likelihood that a particular pixel includes the frames is above the threshold, the pixel is identified as including the frame.

If yes, control continues to 640 to indicate the selected pixel is part of the frame. Otherwise, control continues to 644 determine if another pixel is in the set of pixels. If another pixel is in the set of pixels, control continues 648 to select a next pixel of the set of pixels and returns to 636. Otherwise, if another pixel is not in the set of pixels, control proceeds to 652 to inpaint each pixel indicated as including the frame using a third neural network. Then, control continues to 624 to obtain the selected spectacle from a remote database based on the try on request. Control proceeds to 656 to superimpose the selected spectacle on the obtained image. Control continues to 660 to display the image on the user interface of the user device and returns to 608 to obtain another real-time image from the camera of the user device.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made up of levels of trainable filters, transformations, projections, hashing, pooling and regularization. The models may be used in large-scale relationship-recognition tasks. The models can be created by using various open-source and proprietary machine learning tools known to those of ordinary skill in the art.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multi protocol Label Switching (MPLS) and virtual private networks (VPNs).

The foregoing is provided for purposes of illustrating, explaining, and describing embodiments of the present disclosure. Modifications and adaptations to these embodiments will be apparent to those skilled in the art, and the general principles defined herein can be applied to other implementations without departing from the scope of this disclosure. Thus, the present disclosure is not intended to be limited to the implementations shown herein, but is to be accorded the broadest scope consistent with the novel features and principles disclosed herein.

What is claimed is:

1. A system comprising:
a computing device including at least one processor and communicatively coupled to a camera, the computing device is configured to, in real-time and in response to receiving a request:
    capture at least one image via the camera of a user;
    detect whether a first object is present within the at least one image, wherein the first object is an object that, when worn by the user, is required by the user to properly view a user interface of the computing device, and wherein the first object is selectively removable from the user such that when the first object is removed from the user, the user interface becomes incomprehensible to the user;

if the first object is detected within the at least one image, segment each pixel of a first plurality of pixels within the at least one image, each pixel of the first plurality of pixels corresponding to a pixel within the at least one image having a likelihood the pixel includes a part of the first object;
    based on a segmentation of the first plurality of pixels of the first object, inpaint a second plurality of pixels of the at least one image to produce at least one inpainted images, each pixel of the second plurality of pixels corresponding to a paired pixel of the first plurality of pixels where the likelihood of the paired pixel is above a threshold value;
    based on producing the at least one inpainted image, generate an augmented image by superimposing a selected second object over the at least one inpainted image;
    if the first object is not detected within the at least one image, skip the segmenting and the inpainting to generate the augmented image by superimposing the selected second object over the at least one image; and
    display the augmented image to the user on the user interface of the computing device, the augmented image configured to be properly viewed by the user utilizing the first object.

2. The system of claim 1, wherein the first plurality of pixels includes more pixels than the second plurality of pixels.

3. The system of claim 1, wherein the first plurality of pixels includes fewer pixels than the second plurality of pixels.

4. The system of claim 1, wherein the first plurality of pixels and the second plurality of pixels are the same.

5. The system of claim 1, wherein the computing device is configured to:
capture a real-time video via the camera, the real-time video including the at least one image and at least one subsequent image, the at least one subsequent image being within a subset of a number of frames of the real-time video;
fill a third plurality of pixels in the at least one subsequent image, each pixel of the third plurality of pixels corresponding to a paired pixel of the second plurality of pixels;
based on the filling of the third plurality of pixels in the at least one subsequent image, generate an augmented subsequent image by superimposing the selected second object over the at least one subsequent image; and
display the augmented subsequent image on the user interface of the computing device.

6. The system of claim 5, wherein the subset of the number of frames is based, at least in part, on computational capabilities of the computing device.

7. The system of claim 1, wherein the computing device is configured to, prior to generating the augmented image, reduce spurious noise by blending a previous image with a present image, wherein the blending includes performing a warping operation, a binarization operation, and a pixel-wise multiplication to transform a previous inpainting result prior to mixing with a current inpainting result.

8. The system of claim 1, wherein the computing device is configured, based on each pixel of the first plurality of pixels having the likelihood below a bottom threshold, to generate the augmented image by superimposing the selected second object over the at least one image.

9. The system of claim 1, further comprising a remote database configured to store a set of objects including the selected second object, wherein the computing device is configured to obtain the selected second object from the remote database.

10. The system of claim 1, wherein the selected second object is indicated in the request.

11. The system of claim 1, wherein the computing device is a mobile computing device.

12. The system of claim 1, wherein the first object is a set of spectacles.

13. The system of claim 1, wherein the part of the first object is a frame of a set of spectacles.

14. The system of claim 1, wherein the computing device is configured to:

detect, within the at least one image, the first object by implementing a first neural network;

segment the first plurality of pixels of the first object by determining, for each respective pixel of the first plurality of pixels, the likelihood the respective pixel includes the part of the first object using a second neural network; and inpaint the second plurality of pixels of the at least one image corresponding to the paired pixel of the first plurality of pixels where the likelihood of the paired pixel is above the threshold value by implementing a third neural network.

15. The system of claim 1, wherein the first object is configured to modify vision of the user in viewing the user interface.

16. The system of claim 15, wherein the first object is a pair of spectacles.

17. A method comprising:

in response to receiving a request, capturing, via a computing device including at least one processor and communicatively coupled to a camera, at least one image via the camera;

detecting whether a first object is present within the at least one image, wherein the first object is an object that, when worn by a user, is required by the user to properly view a user interface of the computing device, and wherein the first object is selectively removable from the user such that when the first object is removed from the user, the user interface becomes incomprehensible to the user;

if the first object is detected within the at least one image, segmenting a first plurality of pixels within the at least one image, each pixel of the first plurality of pixels corresponding to a pixel within the at least one image having a likelihood that the pixel includes a part of the first object;

based on a segmentation of the first plurality of pixels of the first object, inpainting a second plurality of pixels of the at least one image to produce at least one inpainted image, each location of the second plurality of pixels corresponding to a paired location of the first plurality of pixels where the likelihood of the paired pixel is above a threshold value;

based on a production of the at least one inpainted image, generating an augmented image by superimposing a selected second object over the at least one inpainted image;

if the first object is not detected within the at least one image, skipping the segmenting and the inpainting to generate the augmented image by superimposing the selected second object over the at least one image; and displaying the augmented image on the user interface of the computing device, the augmented image configured to be properly viewed by the user utilizing the first object.

18. The method of claim 17, wherein the detecting is performed by a spectacle detection module, the segmenting is performed by a segmenting module, and the inpainting is performed by an inpainting module.

19. The method of claim 18, wherein the spectacle detection module, the segmenting module, and the inpainting module comprise separate neural networks.

20. The method of claim 18, wherein the spectacle detection module, the segmenting module, and the inpainting module are separate modules, and wherein breaking a processing pipeline into the spectacle detection module, the segmenting module, and the inpainting module processes the at least one image in real using less memory compared to using a single neural network.

21. The method of claim 18, wherein the inpainting module inpaints fewer than all frames of a real-time video based on computational capabilities of the computing device, and wherein on frames on which the inpainting is not performed, segmented pixels are filled with information from a most recently inpainted image.

22. The method of claim 21, wherein a number of frames that are inpainted is based on a processing capability of the computing device.

23. The method of claim 18, further comprising:

determining computational capabilities of the computing device;

capturing a real-time video including a first plurality of frames including the at least one image via the camera; and filling a third plurality of pixels in a second plurality of frames, each pixel of the third plurality of pixels corresponding to a paired pixel of the second plurality of pixels, wherein the second plurality of frames is based on the computational capabilities of the computing device.

24. The method of claim 23, wherein the second plurality of frames is different from the first plurality of frames.

25. The method of claim 18, further comprising, prior to generating the augmented image, blending a previous image with the at least one inpainted image to reduce spurious noise.

26. The method of claim 18, further comprising, in response to detecting an absence of the plurality of pixels of the first object, skipping the segmenting and the inpainting to generate the augmented image.

27. The method of claim 17, further comprising:

segmenting the first plurality of pixels of the first object by determining, for each respective pixel of the first plurality of pixels, the likelihood the respective pixel includes the part of the first object using a second neural network; and training the second neural network using a dataset, the dataset including images which were manually segmented.

28. A non-transitory computer readable medium having instructions stored thereon, wherein the instructions, when executed by at least one processor, cause a device to in real-time, perform operations comprising:

in response to receiving a request, capturing, via a computing device including the at least one processor and communicatively coupled to a camera, at least one image via the camera;

detecting whether a first object is present within the at least one image, wherein the first object is an object that, when worn by a user, is required by the user to properly view a user interface of the computing device, and wherein the first object is selectively removable from the user such that when the first object is removed from the user, the user interface becomes incomprehensible to the user;

if the first object is detected within the at least one image, segmenting a first plurality of pixels within the at least one image, each pixel of the first plurality of pixels corresponding to a pixel within the at least one image having a likelihood that the pixel includes a part of the first object;

based on a segmentation of the first plurality of pixels of the first object, inpainting a second plurality of pixels of the at least one image to produce at least one inpainted image, each pixel of the second plurality of pixels corresponding to a paired pixel of the first plurality of pixels where the likelihood of the paired pixel is above a threshold value;

based on a production of the at least one inpainted image, generating an augmented image by superimposing a selected second object over the at least one inpainted image;

if the first object is not detected within the at least one image, skipping the segmenting and the inpainting to generate the augmented image by superimposing the selected second object over the at least one image; and displaying the augmented image on the user interface of the computing device, the augmented image configured to be properly viewed by the user utilizing the first object.

29. The non-transitory computer readable medium of claim 28, wherein the detecting is performed by a spectacle detection module, the segmenting is performed by a segmenting module, and the inpainting is performed by an inpainting module.

30. The non-transitory computer readable medium of claim 29, wherein the operations include:

determining computational capabilities of the device;

capturing a real-time video including a first plurality of frames including the at least one image via the camera; and filling a third plurality of pixels in a second plurality of frames, each pixel of the third plurality of pixels corresponding to a paired pixel of the second plurality of pixels, wherein the second plurality of frames is based on the computational capabilities of the device.

31. The non-transitory computer readable medium of claim 29, wherein the operations include blending a previous image with the at least one inpainted image to reduce spurious noise prior to generating the augmented image.

* * * * *